United States Patent

Itoh

[11] Patent Number: 5,973,459
[45] Date of Patent: Oct. 26, 1999

[54] LINEAR MOTOR APPARATUS, AND STAGE APPARATUS, EXPOSURE SYSTEM AND DEVICE PRODUCTION METHOD USING THE LINEAR MOTOR APPARATUS

[75] Inventor: Hiroshi Itoh, Fuchu, Japan

[73] Assignee: Canon Kabushiki Kaisha, Tokyo, Japan

[21] Appl. No.: 08/665,498

[22] Filed: Jun. 18, 1996

[30] Foreign Application Priority Data

Jun. 27, 1995 [JP] Japan .................................. 7-182271

[51] Int. Cl.⁶ ............................ H02K 41/00; H01L 21/68
[52] U.S. Cl. ............................................. 318/135; 310/12
[58] Field of Search .............................. 318/135; 310/12, 310/13

[56] References Cited

U.S. PATENT DOCUMENTS

| | | | |
|---|---|---|---|
| 4,338,559 | 7/1982 | Blaschke et al. | 318/805 |
| 4,431,957 | 2/1984 | Chausse et al. | 318/805 |
| 4,587,472 | 5/1986 | Steinmetz | 310/12 |
| 4,808,901 | 2/1989 | Sakamotor | 318/687 |
| 4,967,135 | 10/1990 | Ashikaga et al. | 318/808 |
| 5,047,676 | 9/1991 | Ichikawa | 318/135 |
| 5,117,164 | 5/1992 | Ishii et al. | 318/135 |
| 5,270,631 | 12/1993 | Takahashi et al. | 318/135 |
| 5,289,088 | 2/1994 | Andoh | 318/135 |
| 5,416,397 | 5/1995 | Mazzara et al. | 318/135 |
| 5,757,149 | 5/1998 | Sato et al. | 318/135 |
| 5,841,250 | 11/1998 | Korenage et al. | 318/135 |

FOREIGN PATENT DOCUMENTS 5-64487  3/1993  Japan .

*Primary Examiner*—Nestor Ramirez
*Assistant Examiner*—Burt Mullins
*Attorney, Agent, or Firm*—Fitzpatrick, Cella, Harper & Scinto

[57] ABSTRACT

A linear motor apparatus includes a mover, a stator, a detector, and a driver. The mover is adapted to be shifted along a shifting direction, and has a predetermined magnetic flux distribution. The stator has a plurality of coils aligned along the shifting direction of the mover. The detector detects the relative position of the mover with respect to the stator. The driver excites two or more coils simultaneously based on a predetermined target value and the output of the detector.

17 Claims, 14 Drawing Sheets

LINEAR MOTOR APPARATUS, AND STAGE APPARATUS, EXPOSURE SYSTEM AND DEVICE PRODUCTION METHOD USING THE LINEAR MOTOR APPARATUS

BACKGROUND OF THE INVENTION

1. Field of the Invention

The present invention relates to a linear motor apparatus suitable for use in office automation equipment, machine tools, semiconductor exposure systems and the like.

2. Description of the Related Art

Japanese Unexamined Patent Publication No. 64487/1993 titled "A Positioning Table Apparatus" discloses the operation of a motor only during an initialization operation. However, even in a normal operating state, coils are excited phase by phase successively to generate propulsion.

FIG. 3 is a block diagram showing the concept of an example of a conventional propulsion control method of a linear motor apparatus. In FIG. 3, a mover 1 of the linear motor has a plurality of N poles and S poles (mover permanent magnets 2a to 2d) of a permanent magnet to form a magnetic flux distribution thereon. A stator 3 of the linear motor has a plurality of stator coils 4a to 4f aligned in a direction at right angles to the direction of the magnetic flux of the mover 1. A position detecting means 5 measures the relative position of the mover 1 with respect to the stator 3 and the distance between the mover 1 and the stator 3. The operation of this system will be described briefly.

The position detecting means 5 outputs a relative position signal 6 representing the relative position of the mover 1 with respect to the stator 3 and the distance between the mover 1 and the stator 3. By the relative position signal 6, a target current value generation means 9 determines a single coil to be energized by the procedures shown in a flowchart of FIG. 5, and outputs currents, which are proportional to a target propulsion signal 8 generated by target propulsion generation means 7 as target current values 10a to 10f, to the coil. Power supply means 11a to 11f constitute, for example, a current minor loop to supply power so that the target current values can be actually passed through the selected coil. The supply of ordered currents 12a to 12f to the specified coil generates a target propulsion on the mover 1.

The flowchart of FIG. 5 showing the procedures of the target current value generation means 9 will now be described. The flowchart is described by means of an equation for determining the propulsion of the linear motor. The construction of this type of linear motor is shown in FIG. 4. In FIG. 4, the left end of the stator 3 is taken as the coordinate origin, and a coordinate along the length of the stator 3 is taken as an x coordinate. The position of the mover 1 can be represented by the x coordinate i.e., the distance from the origin to the left end of the mover 1. In the mover 1, the left end of the mover is taken as the origin and the right side thereof is in a plus direction and taken as τ. The positions of the coils aligned on the stator 3 are represented by $P^L_k$, and $P^R_k$ in which k is a number of identifying the coil, the numbering starting from the leftward end of the stator 3; R and L denote the right end and left end of each coil, respectively; and $i_k$ is a current passing through the coil k. When a function U(x) represented by the following equation (1) is considered, a current i(y) at the y coordinate on the stator 3 (a certain distance from the coordinate origin in the same direction as the x coordinate) is represented by the following equation (2):

$$U(x) = \begin{cases} 1 & (x = 0) \\ 0 & (x \neq 0) \end{cases} \quad (1)$$

$$i(y) = D \sum_{k=1}^{n} i_k \{U(y - P^R_k) - U(y - P^L_k)\} \quad (2)$$

where D is the effective length of each coil.

Therefore, the propulsion F(x) which acts on the mover 1 is determined by the following equation (3):

$$F(x) = D \sum_{k=1}^{n} i_k \int_0^{L_y} B(y-x)\{U(y - P^R_k) - U(y - P^L_k)\} dy \quad (3)$$

where B is a magnetic flux distribution, D is the effective length of each coil and Ly is a length of the stator 3. In this way, the propulsion force acting on the mover 1 is represented by the sum total of the products of distributed magnetic fluxes and currents which interlink with the magnetic fluxes.

Assuming that the distribution of current supplied to each coil is a point, the equation (3) can be transformed into the following equation (4):

$$F(x) = 2 D \sum_{k=1}^{n} i_k \{B(P^R_k - x) - B(P^L_k - x)\} \quad (4)$$

Taking the width of each coil as a fixed value L, the pitch between coils as L/2 and a target current value as $i_r$, the exciting current of the conventional propulsion control method can be determined by the following equations (5):

$$0 \leq P^L_k - x < \frac{L}{4} \quad i_{k+1} = -i_r \quad (5)$$

$$\frac{L}{4} \leq P^L_k - x < \frac{3L}{4} \quad i_k = i_r$$

$$\frac{3L}{4} \leq P^L_k - x < \frac{5L}{4} \quad i_k = i_r$$

$$\frac{5L}{4} \leq P^L_K - x < \frac{6L}{4} \quad i_k = -i_r$$

In the flowchart of FIG. 5, the above-described relational equation is executed. That is, means 9 determines whether the left end of the coils are in turn, positioned directly under the mover 1. When the coils are positioned directly under the mover 1, the coil in the position where the magnetic flux distribution is constant is determined from the left end position of the coil so as to generate a current command value such that the magnitude of the current supplied to the coil is proportional to a target propulsion command value, and the direction of propulsion matches the sign of the current. The position of the mover 1 in which the magnetic flux distribution is fixed is a section in which the amplitude becomes $1/\sqrt{2}$ on the assumption that the magnetic flux distribution is a sine wave of the amplitude of 1.

The method shown in FIG. 5 will now be discussed. In step SA1 the coil number, k, is set to 1. In step SA2, the position under the mover 1, S, of a coil to be energized is determined by the formula $S = P^L_K - x$. In step SA3, the target current value generation means 3 determines whether S is greater than or equal to 0. If not, this means that the left end, x, of the mover 1, is to the right of the left end of the coil k because $P^L_K$ is less than x. In this case, the method skips to step SA16. If S is greater than or equal to 0, the method proceeds to step SA4, where the means 9 determines whether S is greater than or equal to L/4. If not, the method proceeds to step SA5, where means 9 determines the value of the exciting current to be $-i_r$ for the second coil from the left, since $i_{k+1}=i_{l+1}=i_2$. Next, in step SA6, $i_k$ is set to 0 and k is incremented by 1 to k+1. Then, in step SA7, k is incremented again by 1. In step SA8, means 9 determines whether k is greater than N, the number of the coils. If k is greater than N, the process is completed. If k is not greater than N, $i_k$ is set to 0 in step SA9 and the method returns to step SA8.

In step SA4, if S is greater than or equal to L/4, the method proceeds to step SA10 where means 9 determines whether S is greater than or equal to 3/4L. If not, the method proceeds to step SA11 where $i_k$ (the exciting current for the k-th coil) is set equal to $i_r$ (the target current) and the method proceeds to step SA7. If so, the method proceeds to step SA12, where means 9 determines whether S is greater than or equal to 5/4L. If not, the exciting current for the k+1-th coil is set to $i_r$ in step SA13, and the method proceeds to step SA6. If so, the method proceeds to step SA14, where means 9 determines whether S is greater than or equal to 6/4L. If not, the method proceeds to step SA15 where the exciting current for the k-th coil is set to $-i_r$, and the method then proceeds to step SA7. If so, the method proceeds to step SA16 where means 9 sets $i_k$ to 0 and increments k to k+1. Then, the method proceeds to step SA17 where means 9 determines whether k is greater than N. If k is greater than N, the method is completed. If k is not greater than N, the method returns to step SA2.

According to the conventional method, only one coil to be excited is determined by the position of the mover, and the magnitude of the current supplied to the coil is set to a value proportional to the target propulsion, whereby the propulsion generated in the mover is controlled to a desired value.

As described above, according to the conventional method, the propulsion generated in the mover is controlled by utilizing a substantially fixed portion of the magnetic flux distribution produced by a permanent magnet. With respect to a change in the magnetic flux distribution due to a shifting of the mover, the propulsion generated is controlled so as to be proportional to the target current value by switching the coils which are successively excited. However, the magnetic flux distribution produced by the permanent magnet cannot be completely fixed even if a specific portion thereof is utilized. For this reason, a propulsion instability due to a nonuniform magnetic flux distribution is produced. In addition, in switching of the exciting coils, instability is also produced in the propulsion generated when the current value is not zero.

This state is shown in FIGS. 6A and 6B. FIG. 6B illustrates the propulsion generated in the mover when the target propulsion is fixed (44[N]). FIG. 6A illustrates values of command currents 12b to 12e to each of coil. In this way, the conventional method produces propulsion instability due to the non-uniformity of the magnetic flux distribution and propulsion instability produced in switching the exciting coils. Particularly, since the propulsion generated when switching the coils appears as vibration having a high frequency component, it exerts an adverse effect (such as a large vibration) when a speed control device and a position control device are constructed with the use of this propulsion control device.

SUMMARY OF THE INVENTION

It is an object of the present invention to solve the above problems, and more specifically, to provide an excellent linear motor apparatus which produces very small propulsion instability.

It is another object of the present invention to provide a stage apparatus and an exposure system in which a high precision is attained by using the above-described linear motor apparatus.

It is further object of the present invention to provide a device production method which enables a fine processing of devices to be performed.

According to one aspect, the present invention which achieves these objectives relates to a linear motor apparatus comprising a mover, adapted to be shifted along a shifting direction, having a predetermined magnetic flux distribution. The apparatus further comprises a stator having a plurality of coils aligned along the shifting direction of the mover, a detector for detecting the relative position of the mover with respect to the stator, and a driver for exciting two or more coils simultaneously based on a predetermined target value and an output of the detector.

According to another aspect, the present invention relates to a stage apparatus comprising a stage and a linear motor adapted to move the stage. The linear motor comprises a mover, a stator, a detector and a driver. The mover is adapted to be shifted along a shifting direction to move the stage and has a predetermined magnetic flux distribution. The stator has a plurality of coils aligned along the shifting direction of the mover. The detector detects the relative position of the mover with respect to the stator. The driver excites two or more coils simultaneously based on a predetermined target value and an output of the detector.

According to still another aspect, the present invention which achieves these objectives relates to an exposure system comprising a stage on which a substrate is adapted to be placed, means for exposing the substrate on the stage to light in the form of a pattern, and a linear motor adapted to move the stage. The linear motor comprises a mover, a stator, a detector and a driver. The mover is adapted to be shifted along a shifting direction to move the stage and has a predetermined magnetic flux distribution. The stator has a plurality of coils aligned along the shifting direction of the mover. The detector detects the relative position of the mover with respect to the stator. The driver excites two or more coils simultaneously based on a predetermined target value and output of the detector.

According to still another aspect, the present invention which achieves these objectives relates to a method for forming a circuit on a wafer. The method comprises the steps of providing a stage on which the wafer is placed, and moving the stage to a predetermined position at which the wafer will be exposed to radiation in the form of a pattern. The moving step comprises the step of detecting with a detector the relative position of the stator and a mover for moving the stage. The mover has a predetermined magnetic flux distribution and is adapted to be shifted along a shifting direction. The stator has a plurality of coils aligned along the shifting direction. The moving step also comprises the step of exciting two or more coils of the stator simultaneously based on a predetermined target value and the output of the detector and the detecting performed in the detecting step. The method further comprises the step of exposing the wafer to radiation in the form of the pattern after the moving step is performed.

Further objects, features and advantages of the present invention will become apparent from the following description of the preferred embodiments with reference to the attached drawings.

DETAILED DESCRIPTION OF THE PREFERRED EMBODIMENTS

Figure 1:
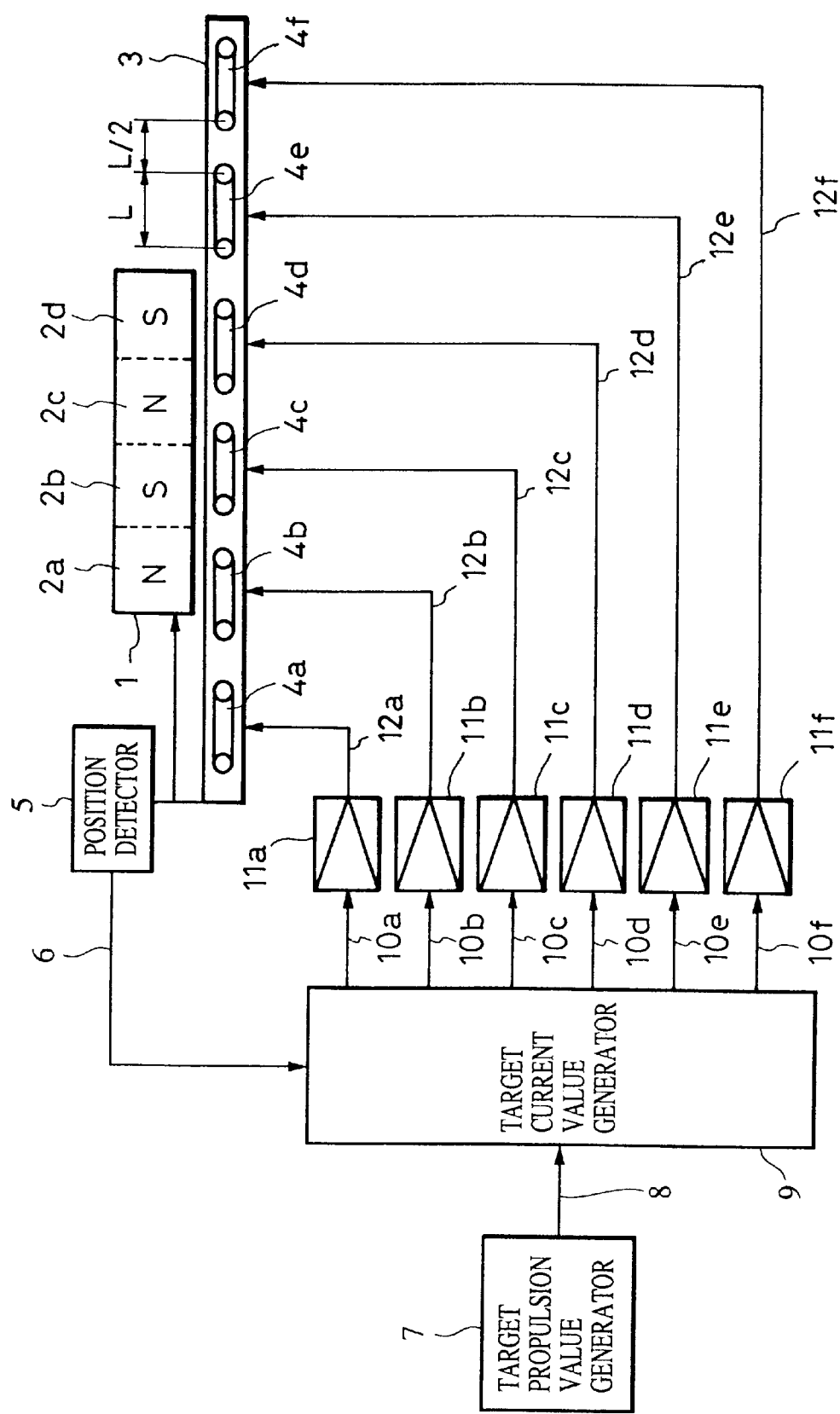
FIG. 1 is a block diagram showing a configuration of a linear motor having a propulsion control device according to an embodiment of the present invention.

In order to describe the present invention, the equation (3) will be employed.

From the equation 3, the propulsion generated by the mover can be represented by the products of the magnetic fluxes of the mover and currents supplied to a plurality of coils interlinking with the magnetic fluxes. Therefore, it is apparent that the propulsion generated by the mover can be controlled to a desired value by properly determining the value of currents supplied to the plurality of coils. The problem is that the magnetic flux distribution is not a simple function, and that a rule for determining a proper target current command value is hard to identify because there are various combinations of current values generating the specified target propulsion. According to the present invention, the current command value is determined on the basis of the following assumption.

(1) Command Current Value when Magnetic Flux Distribution is represented by a Sine Wave:

Assuming that the magnetic flux distribution is represented by a sine wave, the propulsion F(x) generated by the mover can be represented by the following equation (6):

$$F(x) = 2 D \sum_{k=1}^{n} i_k \cos\left\{\frac{(3k-2)}{2}\pi - \omega\right\} \quad (6)$$

in which the currents supplied to two coils are determined as the following equations (7):

$$i_1 = i_r \sin \omega x$$
$$i_2 = i_r \cos \omega x \quad (7)$$

Provided that the current supplied to two coil is determined as above, the sum of a sine square term and a cosine square term is 1. Thus, the sum of propulsion generated by currents passing through two coils and magnetic fluxes is proportional to the target propulsion, regardless of the position x of the mover.

(2) Command Current Value when Magnetic Flux Distribution is represented by a Trapezoidal Wave:

Assuming that the magnetic flux distribution B(y) of the mover is represented by the following equation (8) when it is shaped like a trapezoid. That is, it is assumed that the magnetic distribution is represented by a trapezoidal wave, and that this waveform can be represented by a Fourier series so as to be approximated by the first and second terms thereof.

$$B(y) = a_1 \sin \omega y + a_2 \sin 3\omega y \quad (8)$$

$$a_1 = \frac{4A}{\pi \omega \tau} \sin \omega \tau, \ a_2 4A \sin 3\frac{\omega \tau}{\pi \omega \tau 3^2}$$

where ω is the angular frequency of the trapezoidal wave determined by its duty cycle, A is the amplitude of the trapezoidal wave, and τ is the inclination of the trapezoidal wave, and the currents supplied to two coils are determined as the following equation (9):

$$i_k = i_r \left[a_1 \cos\left\{\frac{(3k-2)}{2}\pi - \omega x\right\} + a_2 \cos\left\{\frac{3(3k-2)}{2}\pi - 3\omega x\right\}\right] \quad (9)$$

Provided that the current value is determined as above, the propulsion generated can be expressed by sine and cosine square terms. In addition, terms of the same frequency have the same value. Therefore, the sine and cosine terms are nullified, as in the foregoing description. Consequently, the generated propulsion is proportional to the target propulsion, regardless of the position x of the mover.

As described above, when the magnetic flux distribution is represented by a sine wave or a trapezoidal wave, propulsion which is proportional to a target propulsion can be generated regardless of the position of the mover. The sine wave is included in the trapezoidal wave because it corresponds to a case in which the second term of the trapezoidal wave in the Fourier series, which is a tertiary harmonic component, is set to 0. Therefore, since it is sufficient that the trapezoidal wave is the object of a description, the description of the invention will now be made assuming that the magnetic flux distribution is represented by the trapezoidal wave. In addition, although it is herein described that two coils are excited, it is within the scope of the present invention to use the same idea to excite even numbers (4, 6 . . . ) of coils.

Embodiments of Linear Motor Apparatus

Figure 3:
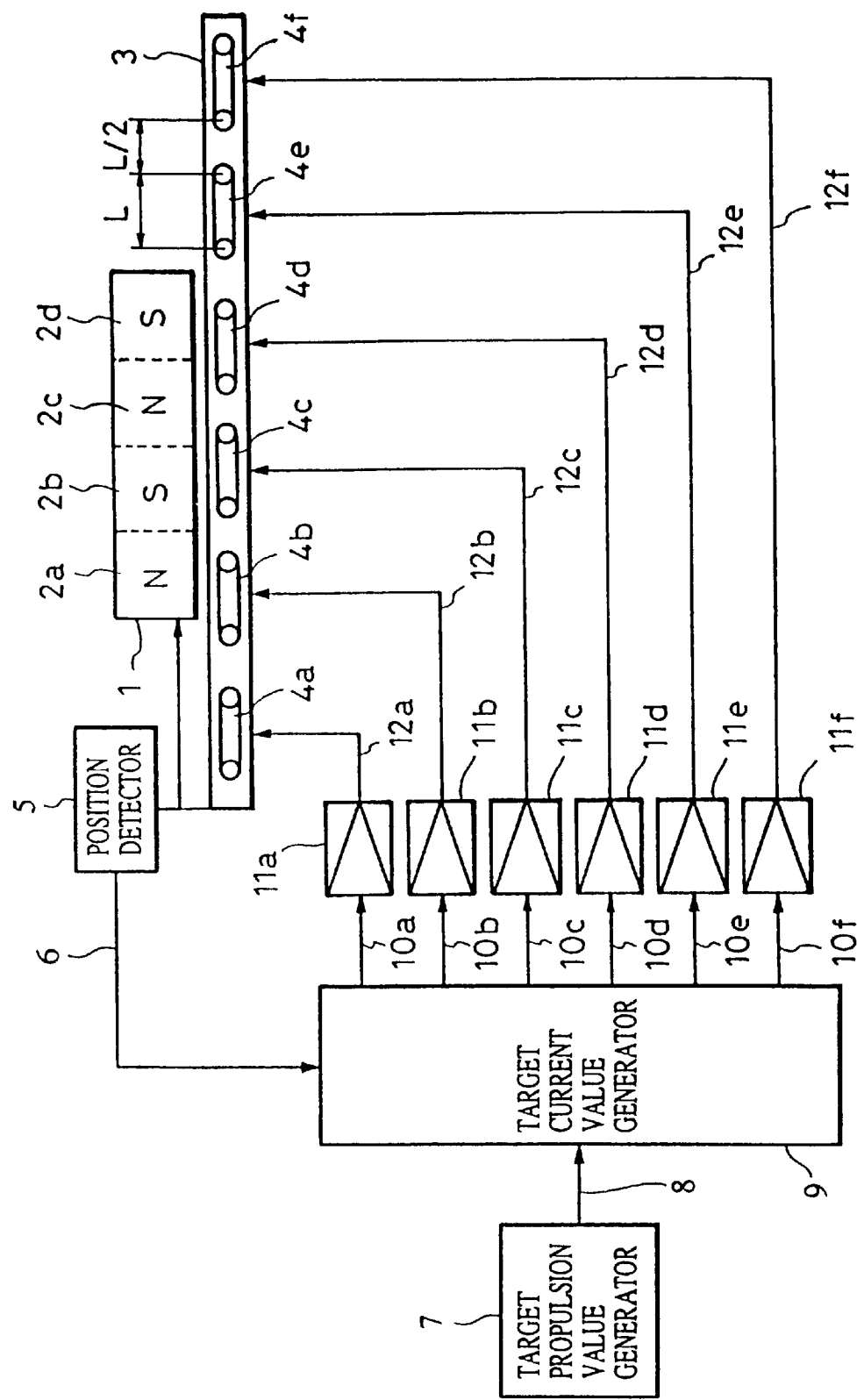
FIG. 3 is a block diagram showing an example of a conventional propulsion control method of a linear motor.
Figure 4:
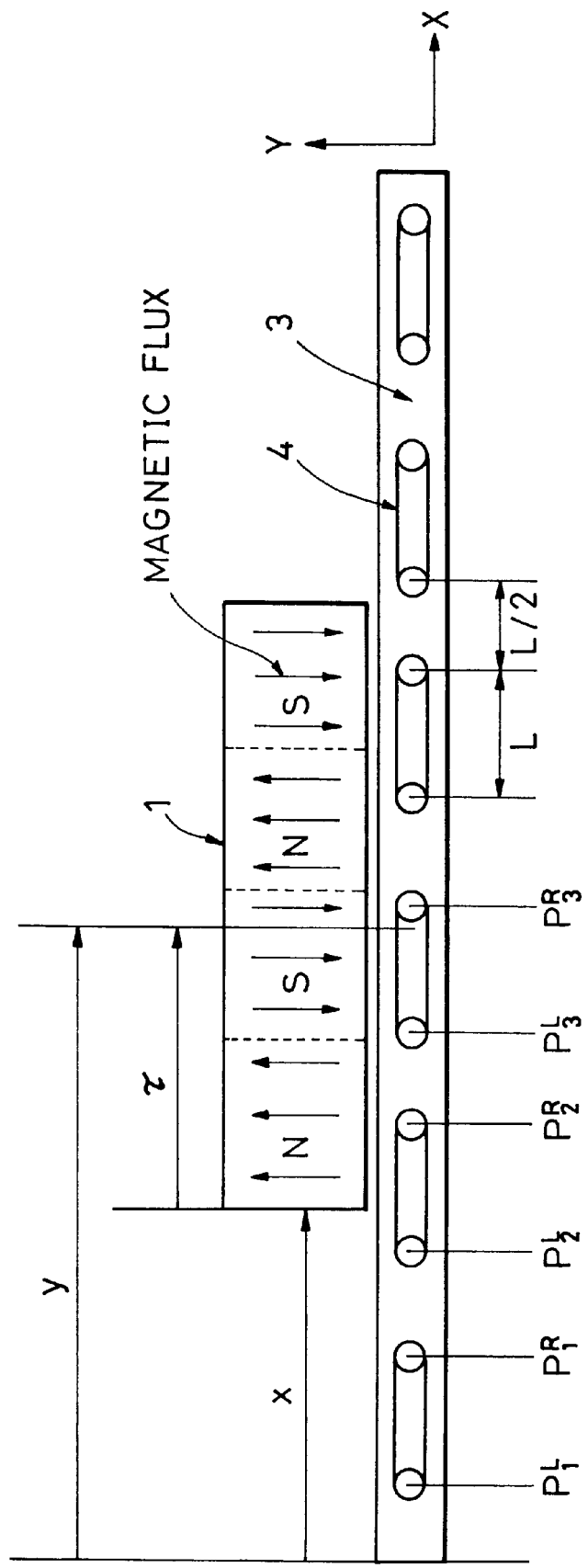
FIG. 4 is a schematic view for explaining each coefficient and variable in equations of a target current value generation means of the propulsion control device shown in FIG. 1.
Figure 5:
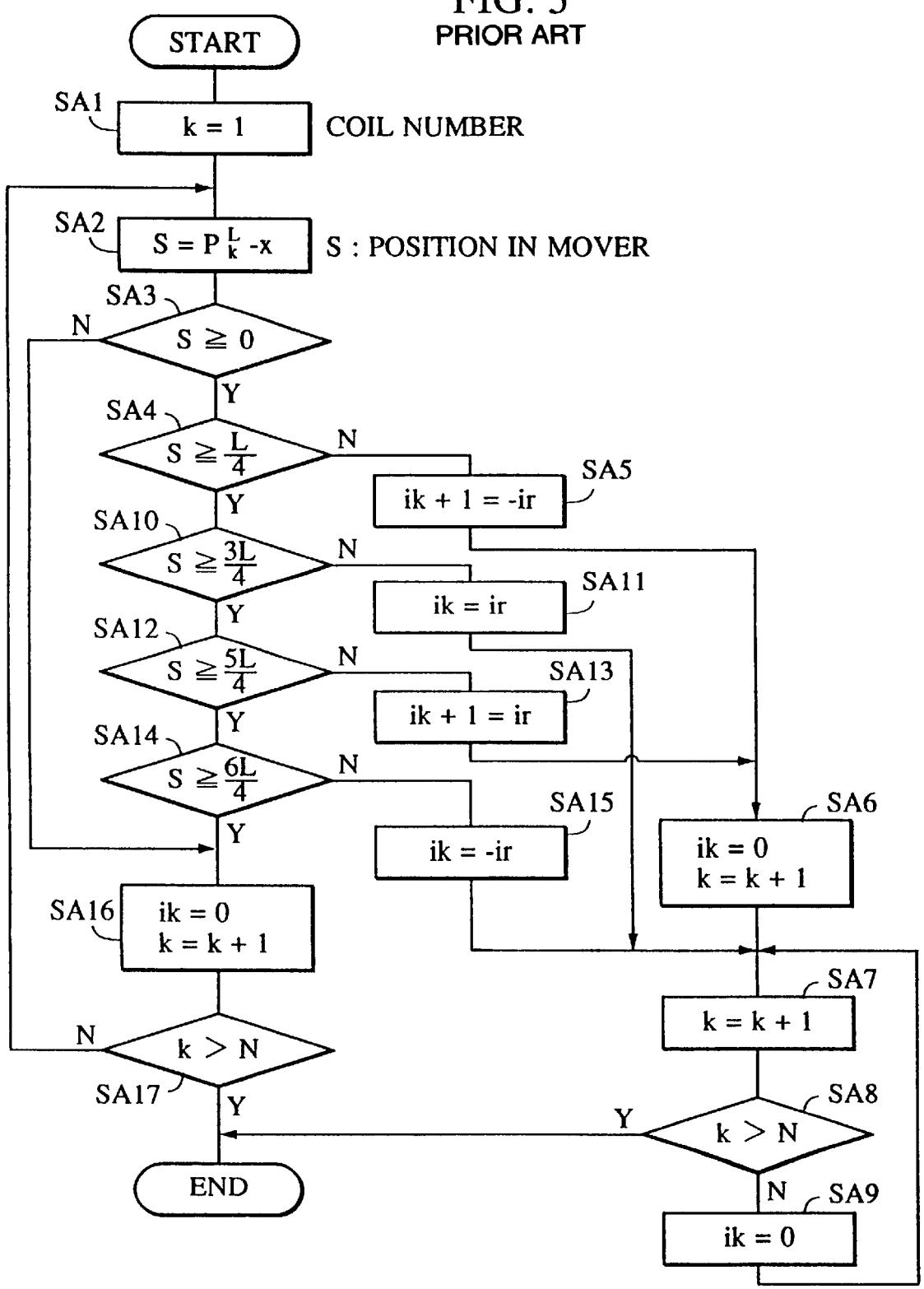
FIG. 5 is a flowchart showing the procedures of a conventional target current value generation means.
Figure 6A:
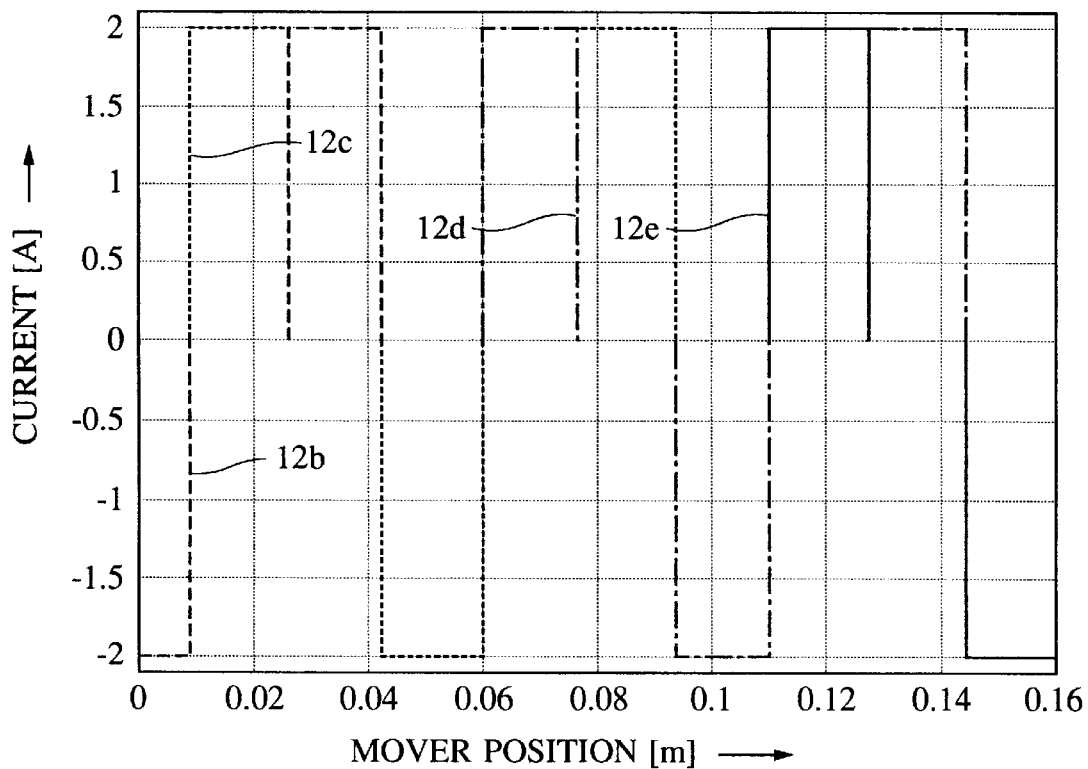
FIGS. 6A and 6B illustrate the characteristics of propulsion generated of the mover when a target propulsion is fixed.
Figure 6B:
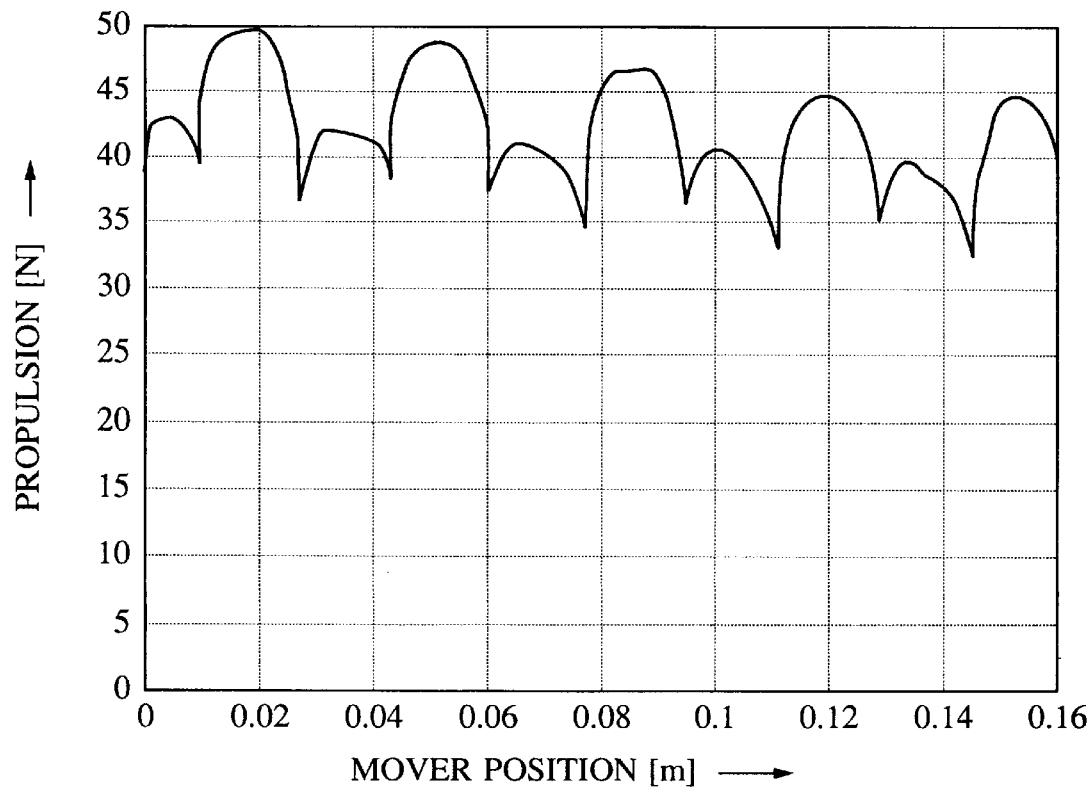

FIG. 1 is a block diagram showing a configuration of an embodiment of a linear motor apparatus having a propulsion control device. The configuration on this block diagram is the same as that of FIG. 3 showing the conventional propulsion control method; the difference is the method by which the target current value generation means 9 operates. As shown by the flowchart of FIG. 5, the target current value generation means 9 of the conventional method determines only one coil to be excited by means of the position of the mover, and sets the magnitude of the current to a value proportional to the target propulsion. In contrast to this, the target current value generation means 9 of this embodiment supplies current simultaneously to a plurality of coils, and determines the current values supplied to the coils so that the sum total of propulsion generated by the coils matches the target propulsion.

Figure 2:
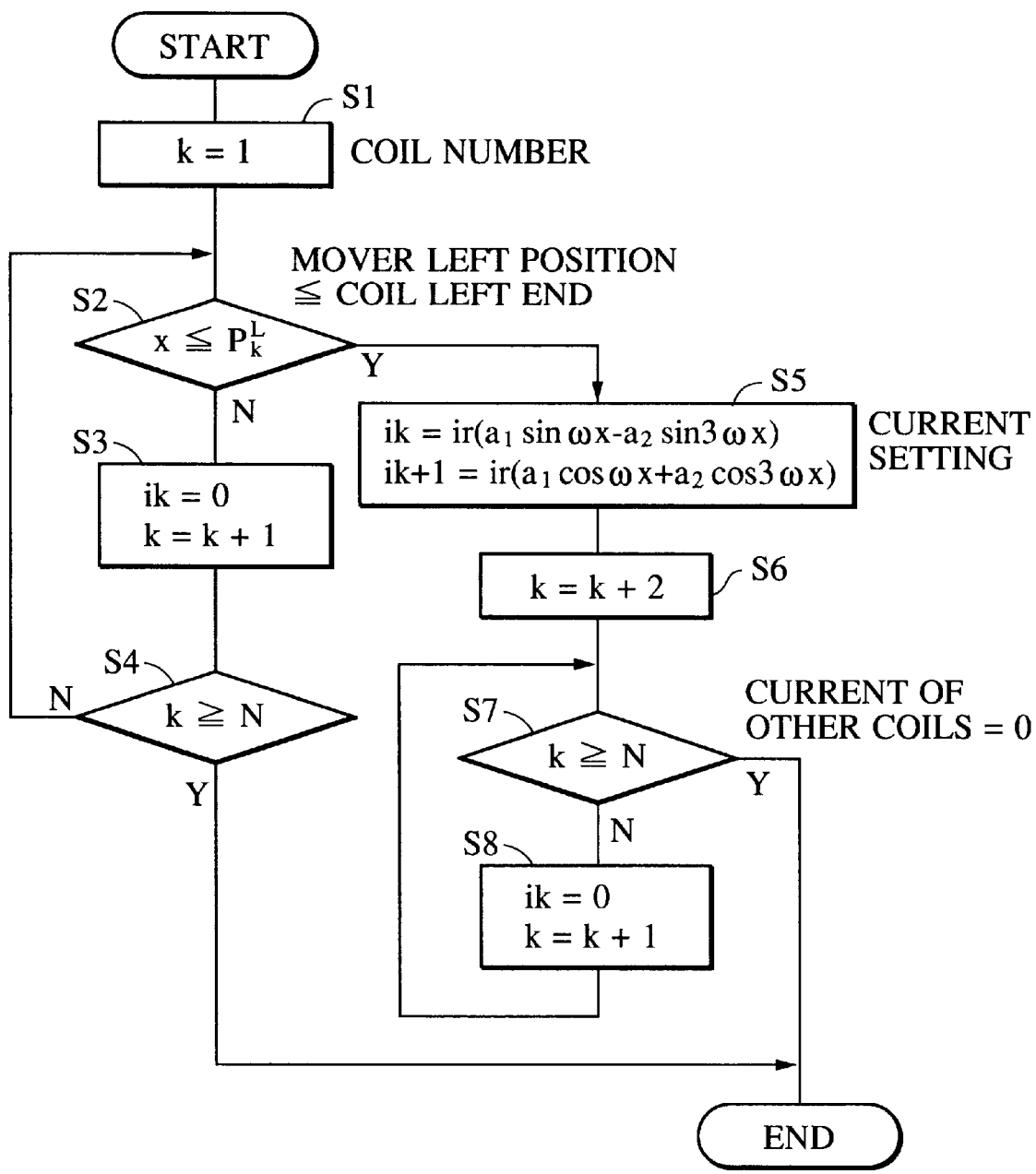
FIG. 2 is a flowchart showing the procedures of a target current value generation means.
Figure 7A:
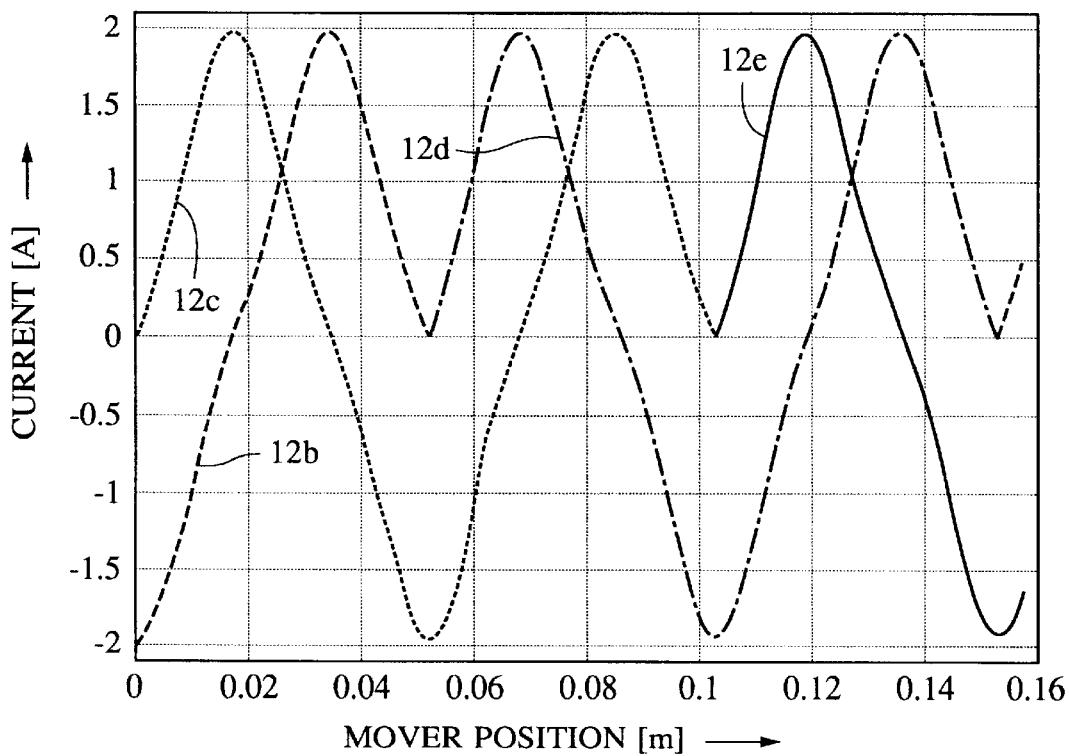
FIGS. 7A and 7B illustrate characteristics of applied current and generated propulsion of the propulsion control device shown in FIG. 1.
Figure 7B:
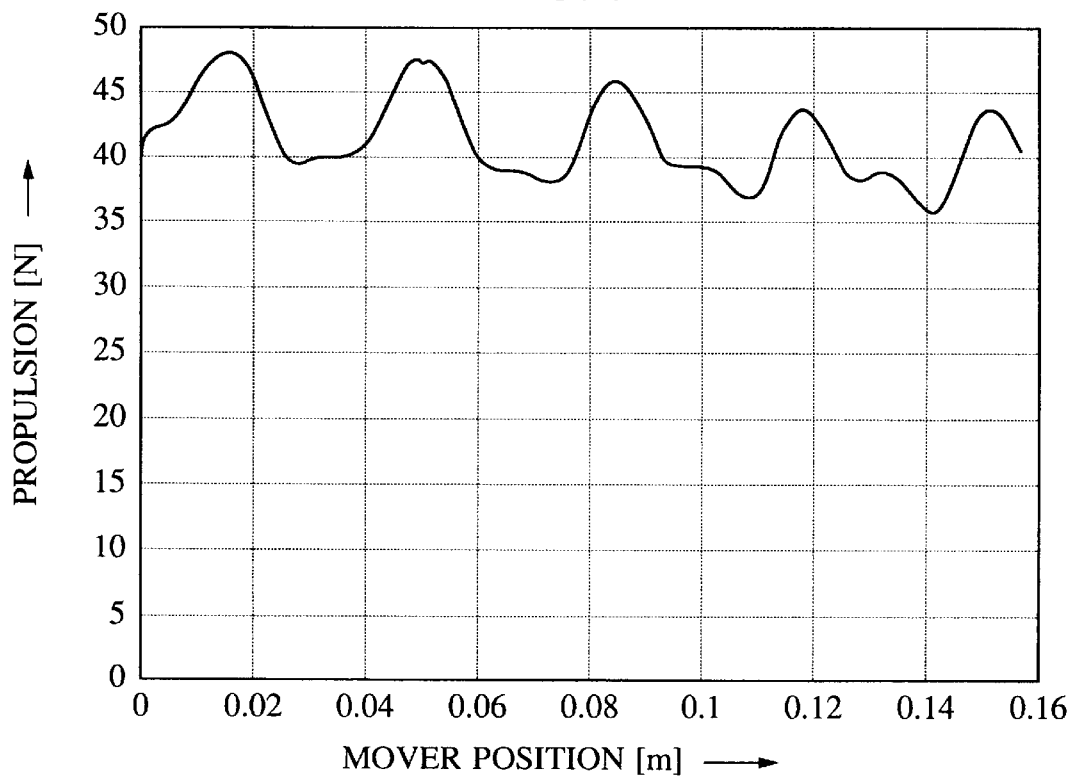

In this embodiment, an example will be described in which the permanent magnet of the mover 1 has 4 poles. Two coils are excited simultaneously. The target current value generation means 9 determines the current supplied to two coils in accordance with the equations 8 and 9 based on a position signal from the position detecting means 5 and a target propulsion value generated by a target propulsion generation means 7. In addition, characteristics of an applied current and generated propulsion are shown in FIGS. 7A and 7B, respectively. FIG. 2 is a flowchart showing the procedures of the target current value generation means 9.

According to the target current value generation means 9 of this embodiment, the initial value 1 is first set for the coil number in step S1. Then, means 9 determines in step S2 whether or not the position x of the left end of the mover 1 is positioned left of the left end of k-th coil. If x is so positioned, the procedure advances to step S5. If not, the current $i_k$ of the k-th coil is set to 0, and k is incremented by 1 in step S3 and then, the procedure advances to step S4.

In step S4, means 9 determines whether or not k has reached the number N which is the total number of coils. If k has reached the number N, the procedure is terminated. If not, the procedure returns to step S2.

On the other hand, in step S5, the currents $i_k$ and $i_{k+1}$ of k-th and k+1-th coils are set in accordance with the following equations (10):

$$i_k = i_r(a_1 \sin \omega x - a_2 \sin 3 \omega x)$$

$$i_{k+1} = i_r(a_1 \cos \omega x + a_2 \cos 3 \omega x) \quad (10)$$

Then, k is incremented by 2 in step S6, and means 9 determines in step S7 whether or not k is greater than or equal to the number N of coils. When k is not N or greater, the current $i_k$ of the k-th coil is set to 0 and k is incremented by 1 in step S8 and then, the procedure returns to S7. When k is N or greater, the procedure is terminated.

Figure 8:
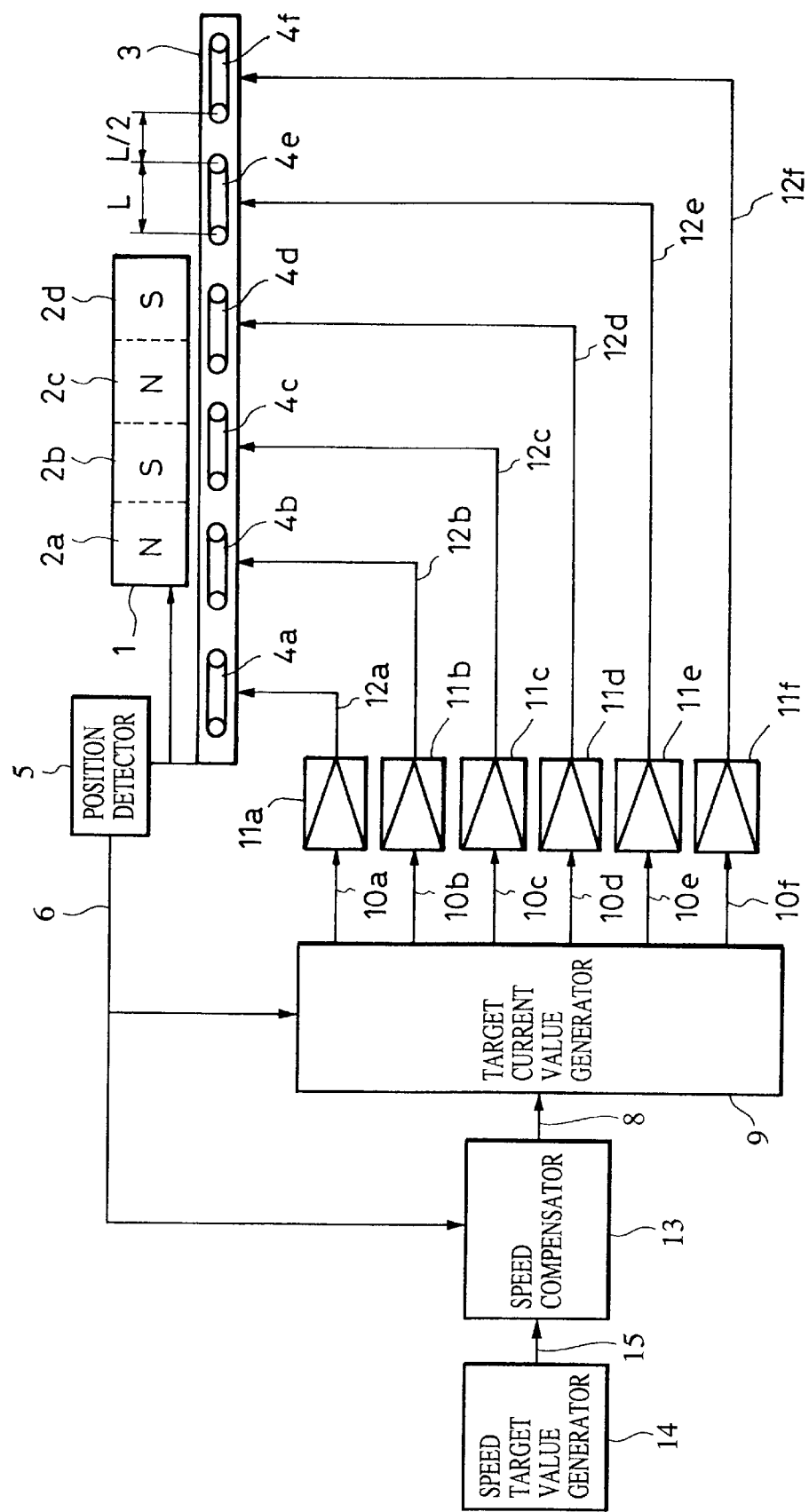
FIG. 8 is a block diagram showing the configuration of a speed control device using the propulsion control device shown in FIG. 1.
Figure 9:
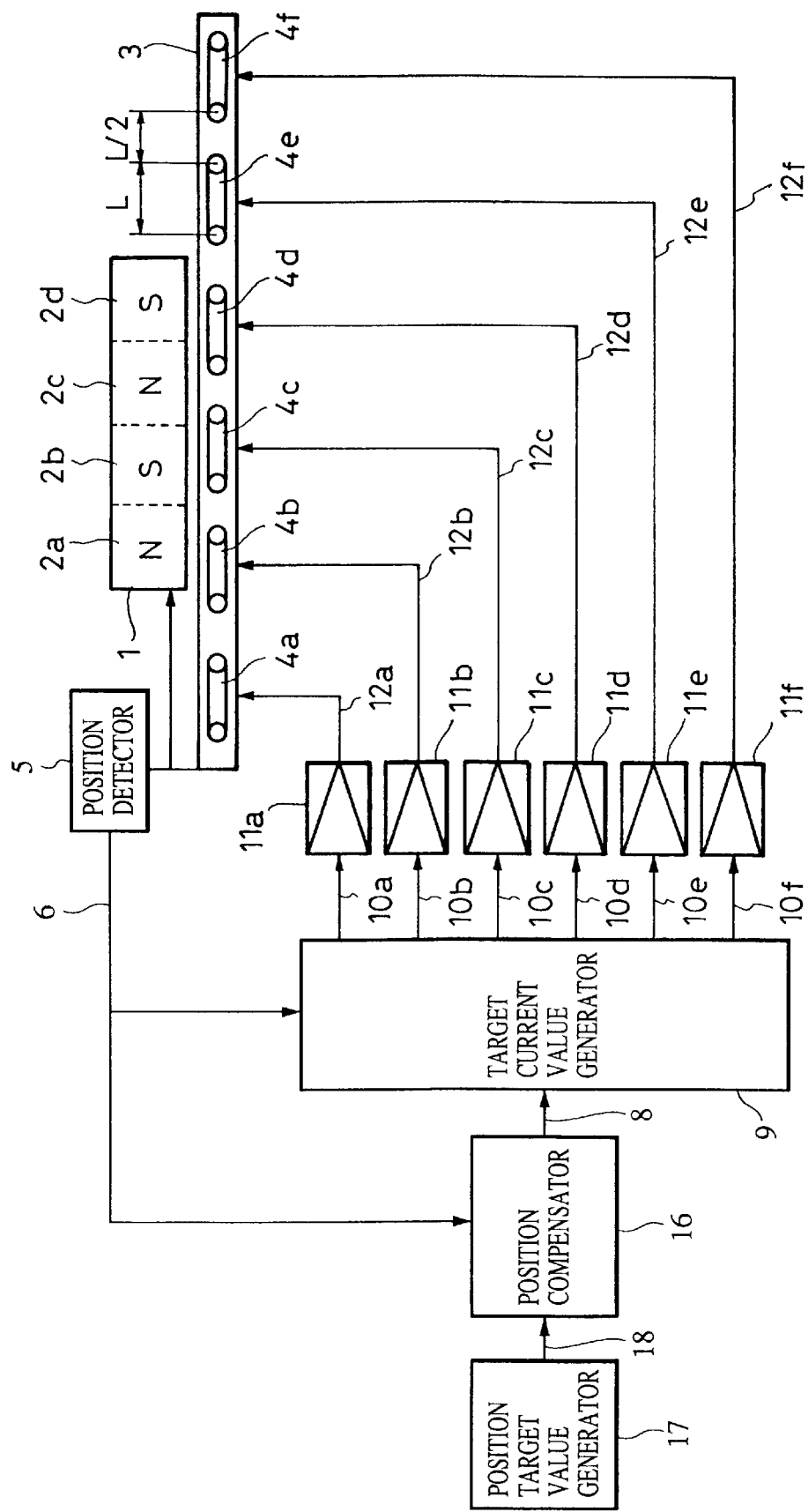
FIG. 9 is a block diagram showing a configuration of a position control device using the propulsion control device shown in FIG. 1.

Next, a speed control device and a position control device of the linear motor are constructed using this propulsion control device. FIG. 8 is a block diagram showing a speed control device constructed with the use of the propulsion control device of FIG. 1. FIG. 9 is a block diagram showing a position control device constructed with the use of the propulsion control device of FIG. 1.

In the speed control device shown in FIG. 8, a speed compensator 13 is of a proportional integral (PI) type. Assume that speed information is obtained by differentiation of a position information of the position detection means 5. The speed compensator 13 generates a target propulsion signal 8 from a speed target value signal 15 generated by a speed target value generation means 14 and the speed information.

Figure 10A:
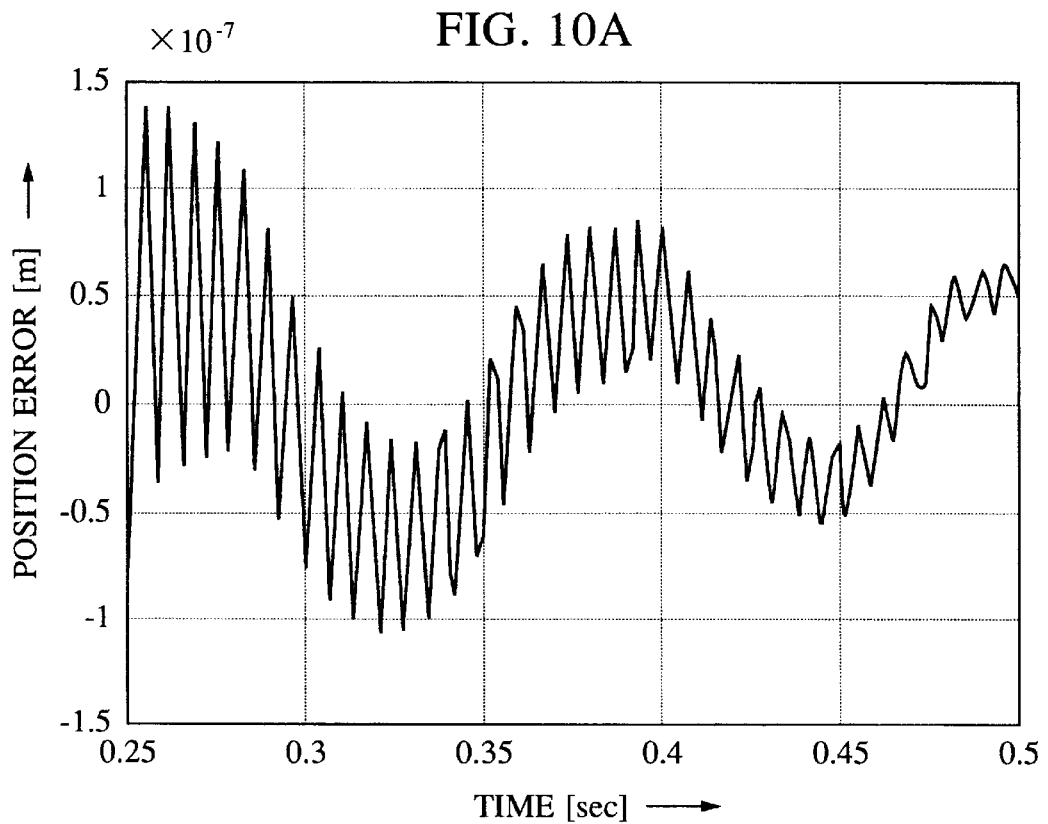
FIG. 10A illustrates a position error response to a stepwise of a position target value.
Figure 10B:
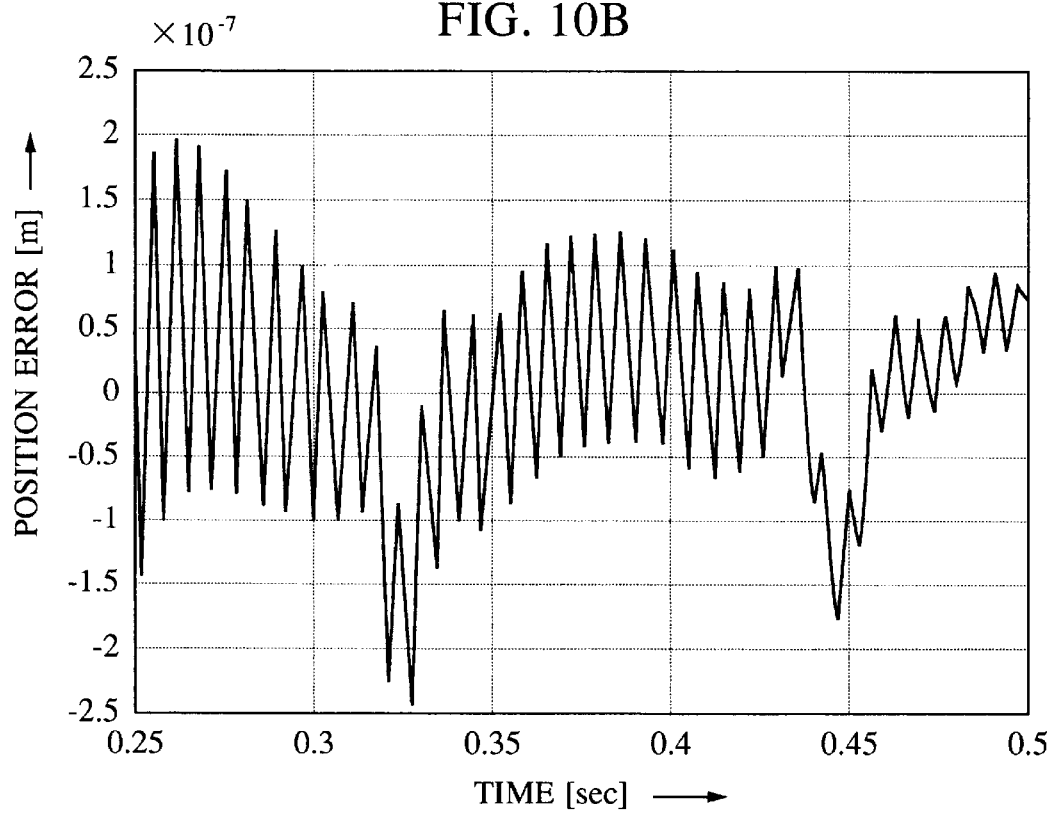
FIG. 10B illustrates a waveform of a position error response when the target current value generation means is constructed by a conventional method.

In the position control device of FIG. 9, a position compensator 16 is of a proportional integral and differential (PID) type. The position compensator 16 generates the target propulsion signal 8 from a position target value signal 18 generated by a position target value generation means 17 and a position information signal 6. FIG. 10A illustrates a position error response to a stepwise input of a position target value signal 18 near the settling thereof. FIG. 10B illustrates a similar response in the same construction of the position control device as that of shown in FIG. 9, except that the target current value generation means 9 is constructed by the conventional method. As is apparent from these drawings, according to the conventional method, a great position error is produced at a switching point of the coils. The method of this embodiment of the present invention, in contrast, exhibits good controllability without causing such a vibration.

Figure 11:
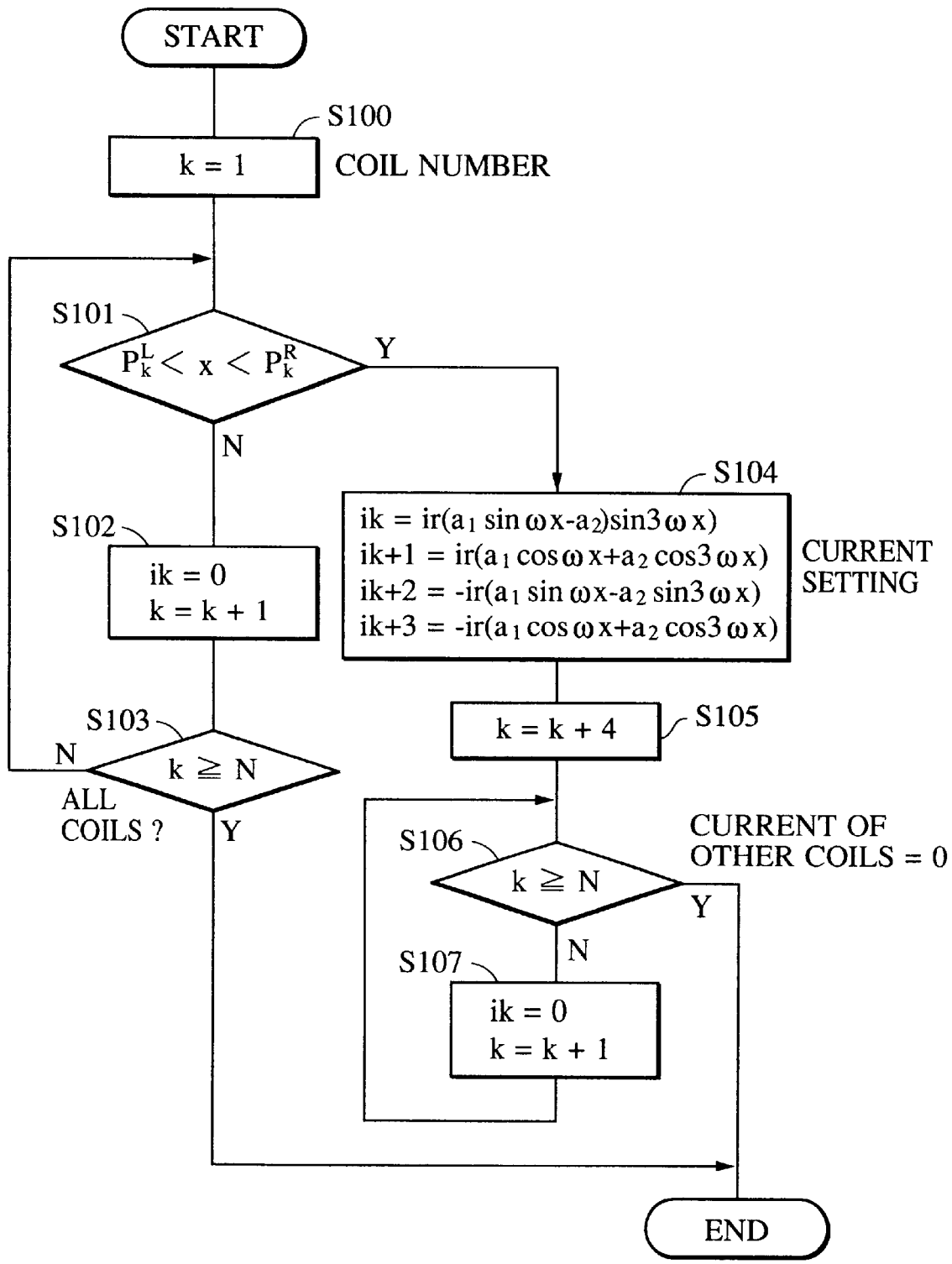
FIG. 11 is a flowchart showing the procedures of the target current value generation means.

An example will now be described in which the permanent magnet of the mover 1 has 6 poles. In this case, 4 or 5 coils are excited. Otherwise, the configuration of the block diagram of this case is also the same as that of FIGS. 1, 8 and 9. The procedures followed by of the target current value generation means 9 are shown by a flowchart of FIG. 11.

That is, according to the target current value generation means 9, the initial value 1 is first set for the coil number in step S100. Then, means 9 determines in step S101 whether or not the position x of the left end of the mover 1 is positioned between the right end and the left end of the k-th coil. If x is positioned between the right end and the left end of the k-th coil, the procedure advances to step S104. If x is not positioned between the right end and the left end of the k-th coil, the current $i_k$ of the k-th coil is set to 0, and k is incremented by 1 in step S102 and then, the procedure advances to step S103.

In step S103, whether or not k has reached or exceeds the number N of coils is determined. If k has reached or exceeds the number N, the procedure is terminated. If not, the procedure returns to step S101.

On the other hand, in step S104, the currents $i_k$ to $i_{k+3}$ of k-th to k+3-th coils are set in accordance with the following equations (11):

$$i_k = i_r(a_1 \sin \omega x - a_2 \sin 3 \omega x)$$

$$i_{k+1} = i_r(a_1 \cos \omega x + a_2 \cos 3 \omega x)$$

$$i_{k+2} = -i_r(a_1 \sin \omega x + a_2 \sin 3 \omega x)$$

$$i_{k+3} = -i_r(a_1 \cos \omega x - a_2 \cos 3 \omega x) \quad (11)$$

Then, k is increased by 4 in step S105, and means 9 determines in step S105 whether or not k is or exceeds the number N of coils. If k does not, the current $i_k$ of the k-th coil is set to 0 and k is incremented by 1 in step S107 and then, the procedure returns to S106. When k is or exceeds N, the procedure is terminated.

According to the linear motor apparatus including the mover which has the permanent magnet of 6 poles, one and a half times the number of magnets of the linear motor apparatus shown in FIG. 1 is required, but the generated propulsion can be doubled. Thus, this embodiment is useful when a great propulsion is required. In addition, the linear motor apparatus has the advantage that the heat generated can be reduced with respect to the same propulsion as that of the linear motor apparatus shown in FIG. 1.

As described above, the coils to be excited are switched when the current value applied to the coils is zero. Thus, the propulsion instability produced when switching the coil can be reduced to zero. In addition, by supplying a current matched with the magnetic distribution of the mover to the coils of the stator, the propulsion instability due to a non-uniformity of the magnetic flux distribution can be reduced. Thus, the propulsion is reduced, and good propulsion control can be performed. That is, a high performance linear motor having position controllability and speed controllability can be provided by utilizing a good propulsion controllability.

Embodiment of Scanning Exposure System

An embodiment of a scanning exposure system which includes a stage apparatus utilizing the linear motor apparatus as described above will now be described.

Figure 12:
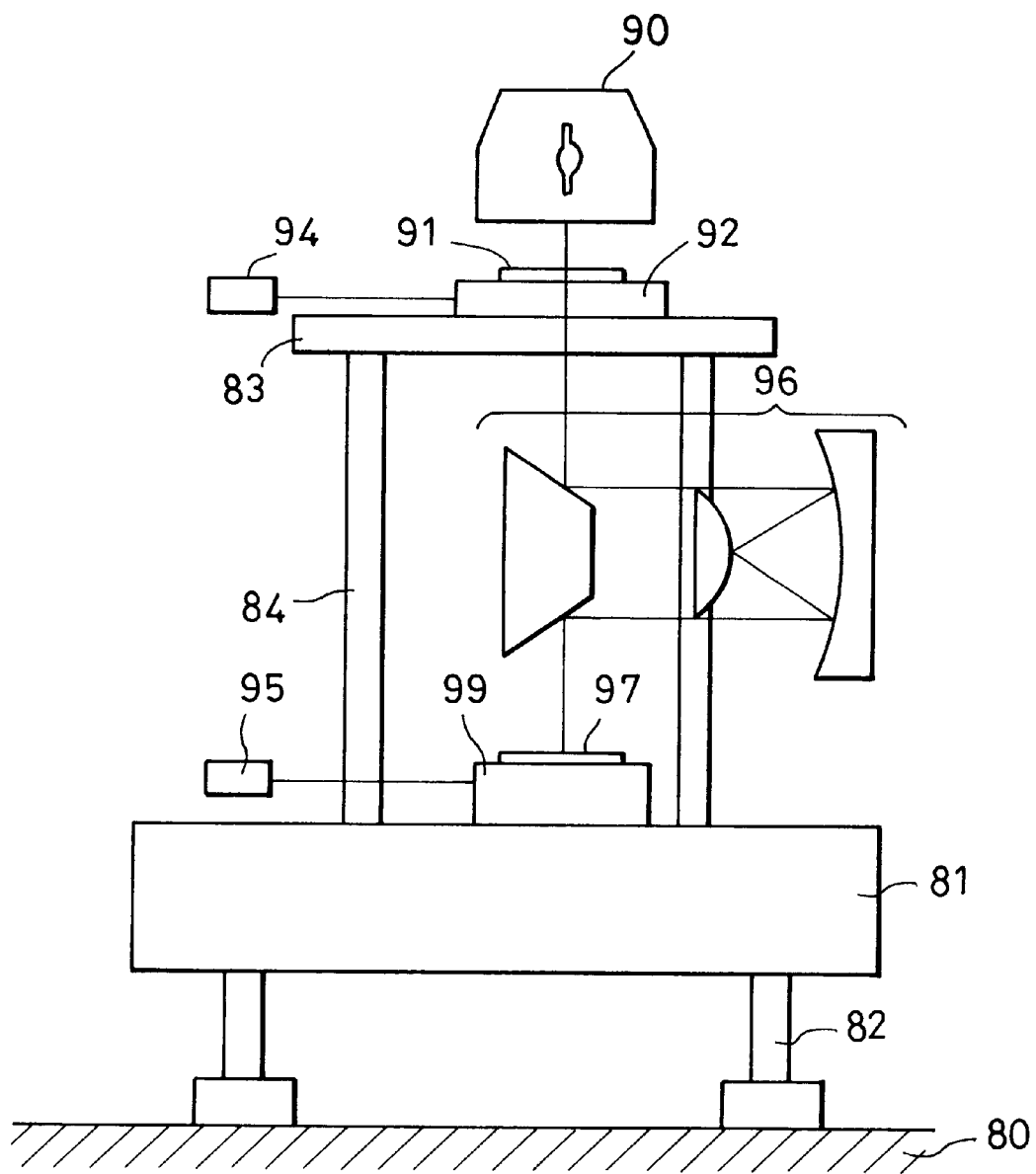
FIG. 12 is a block diagram showing a configuration of an embodiment of a scanning exposure system.

FIG. 12 is a block diagram showing the entire construction of the scanning exposure system. Referring to FIG. 12, a first base surface plate 81 is supported on a floor 80 through a vibration-proof mechanism 82. A second base surface plate 83 is provided above the first base surface plate 81 through a frame 84. A first stage 99 for chucking, scanning and shifting in a one-dimensional direction a wafer 97, which is a base plate to be exposed, is provided on the first base surface plate 81. The first stage 99 includes a driving mechanism which is equivalent to the linear motor apparatus as described in the previous embodiments. A laser length measuring machine 95 monitors the shifting of the first stage 99. A second stage 92 for chucking, scanning and shifting in a one-dimensional direction a reticle 91 having a transfer pattern is provided on the second base surface plate 83. The second stage 92 includes a driving mechanism which is equivalent to the linear motor apparatus as described in the previous embodiments. A laser length measuring machine 94 monitors the shifting of the second stage 92. A light source 90 produces a luminous light for exposing and transferring a pattern of the reticle 91 to the wafer 97, and provides a partially slit-shaped luminous light to the reticle 91. A reduction image optical system 96 reduces the pattern of the reticle 91 to a predetermined magnification (1:4) to form an image on the wafer 97.

In such a configuration, the first and second stages 99 and 92 are synchronously scanned with the ratio of their scanning speeds set to the same value of the reduction optical system (i.e., 1:4), whereby the entire pattern of the reticle 91 is reduced and transferred to the wafer 97.

At this time, by driving each of the linear motors of the first stage 99 and the second stage 92 with a method as described in the previous embodiments, scanning instability for both of the stages is substantially reduced. In a scanning exposure system, scanning instability directly causes a distortion of the transferring pattern. Therefore, the exposure system of this embodiment permits the accuracy of pattern transfer to be improved rapidly.

Embodiment of Device Production Method

An embodiment of a method of producing devices utilizing the above-described exposure system will now be described.

Figure 13:
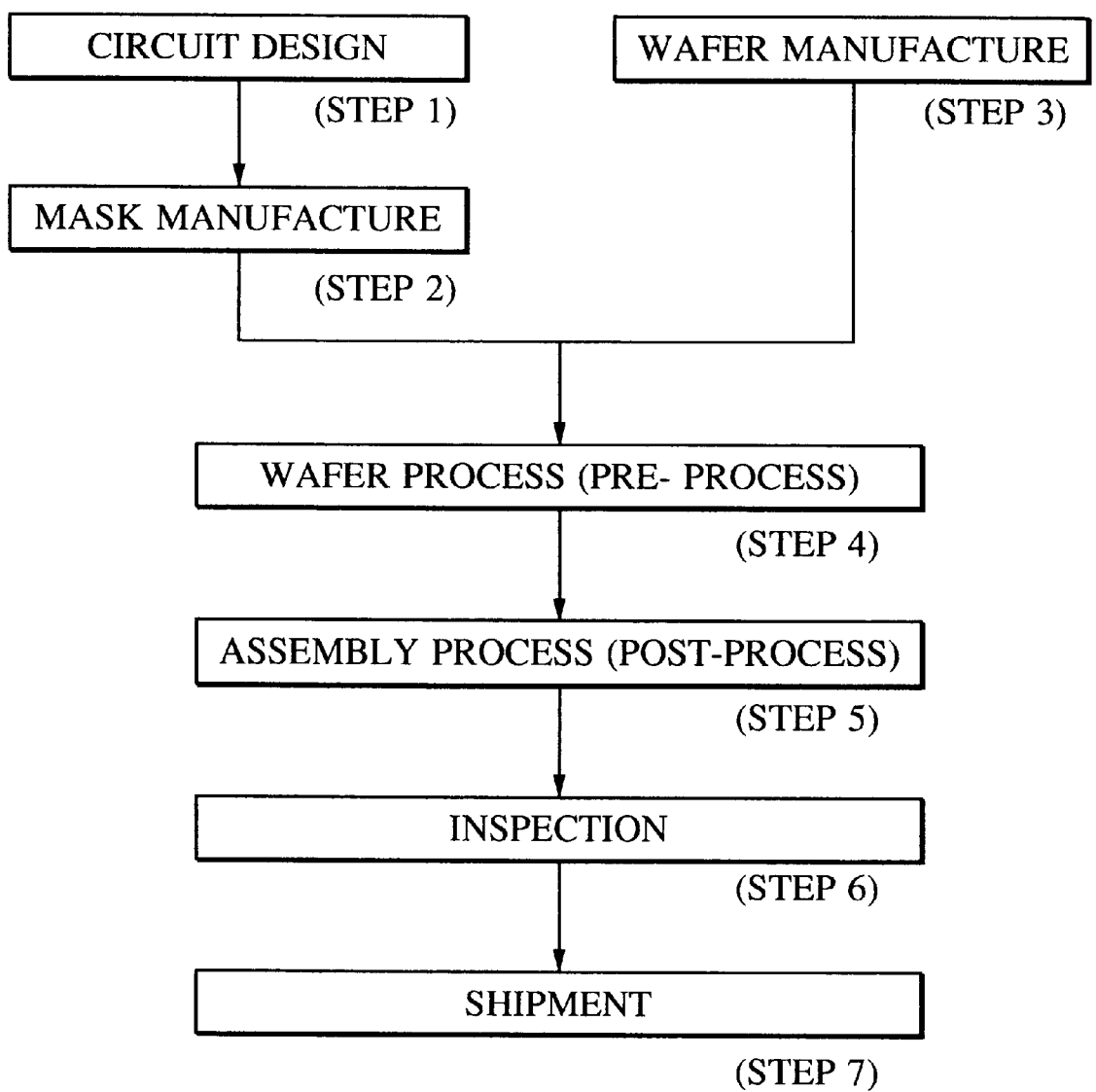
FIG. 13 is a flowchart showing the steps of manufacturing a device.

FIG. 13 is a flowchart showing the steps in a method of manufacturing fine devices (such as a semiconductor chip for an integrated circuit (IC) and a large scale integrated circuit (LSI), a liquid crystal panel, a charge coupled device (CCD), a thin film magnetic head and a micromachine, etc.). In step 1 (circuit design), a circuit for the semiconductor device is designed. In step 2 (wafer manufacture), a mask on which a circuit pattern is formed is manufactured. On the other hand, in step 3 (wafer manufacture), a wafer is manufactured using a material such as a silicon. Step 4 is called a pre-process in which the circuit is actually formed on the wafer by lithographic technology using the above prepared mask and wafer. The next step 5 (assembly process) is called a post-process which is a procedure for transforming devices into semiconductor chips using the wafer manufactured in step 4 and which includes procedures such as an assembly procedure (dicing and bonding) and a packaging procedure (chip sealing). In step 6 (inspection), an operation verification test and a durability test of the semiconductor device manufactured in step 5 are conducted. The semiconductor devices are completed through these procedures, and the completed semiconductor devices are shipped (step 7).

Figure 14:
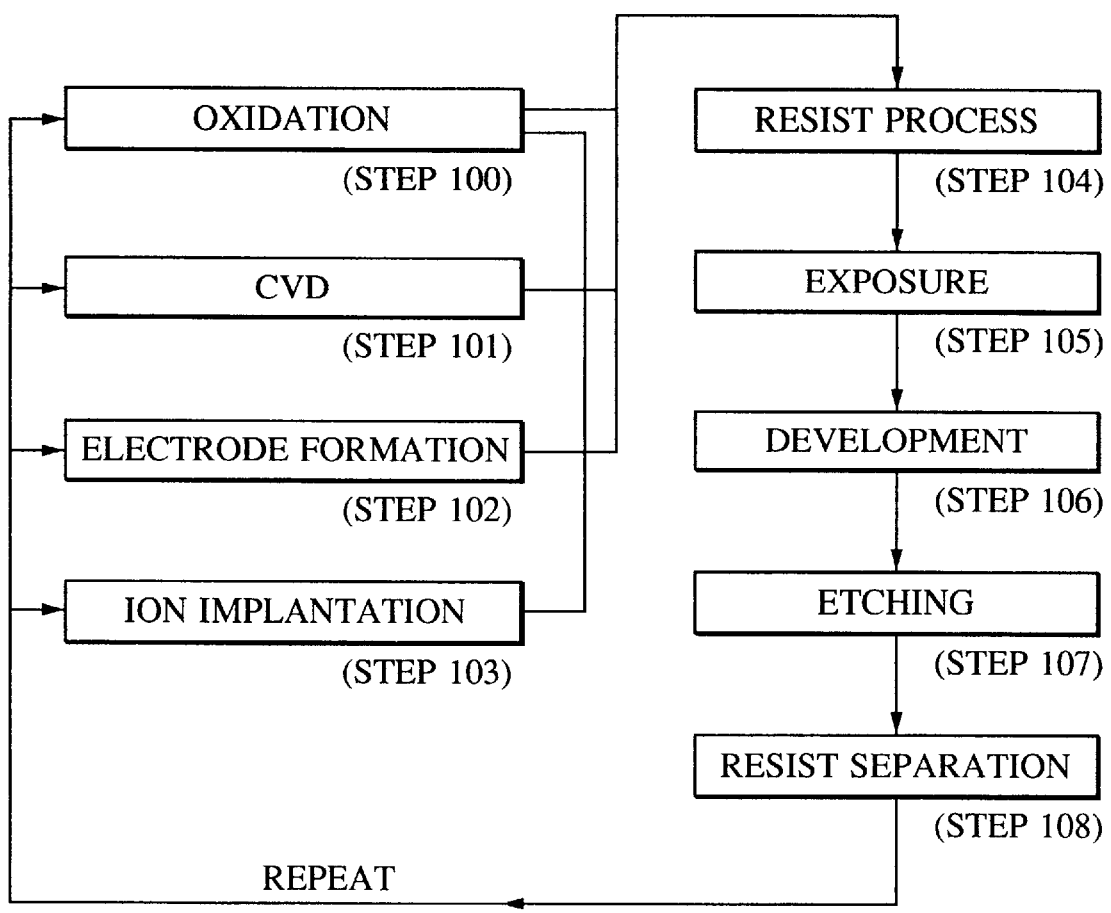
FIG. 14 is a flowchart showing the steps of a wafer process.

FIG. 14 is a flowchart showing detailed steps of the above-described wafer process. In step 100 (oxidation), the surface of the wafer is oxidized. In step 101 (CVD), an insulating film is formed on the surface of the wafer. In step 102 (electrode formation), electrodes are formed on the wafer by evaporation. In step 103 (ion implantation), ions are implanted into the wafer. In step 104 (resist process), a photosensitive agent is applied to the wafer. In step 105 (exposure), a circuit pattern of the mask is printed and exposed to the wafer by the above-described exposure system. In step 106 (development), the exposed wafer is developed. In step 107 (etching), a portion other than the developed resist image is etched away. In step 108 (resist separation), etched and unnecessary resist is removed. By repeatedly performing these steps, circuit patterns are formed on the wafer.

The method of producing devices of this embodiment permits high-integration semiconductor devices, which have been difficult to be manufactured previously, to be manufactured at a low cost.

What is claimed is:

1. A linear motor apparatus, comprising:
   a movable member shiftable along a shifting direction, said movable member including a permanent magnet having a predetermined magnetic flux distribution;
   a stator having a plurality of coils arranged along the shifting direction of said movable member, the plurality of coils being arranged over a range of shifting of said movable member and being separately excitable;
   a detector for detecting a relative position of said movable member with respect to said stator;
   a target current value generator for calculating for each of two or more coils an independent current value which generates an individually determined propulsive force from each of the two or more coils, such that the sum of the individually determined propulsive forces is substantially equivalent to a predetermined propulsion target value; and
   a driver for supplying a current equal to the independent current value to each of the two or more coils simultaneously, wherein (i) an output of said detector determines which coils said driver excites at a given time, and (ii) the predetermined propulsion target value and an approximation of the predetermined magnetic flux distribution are used to determine the independent current values.

2. A linear motor apparatus according to claim 1, wherein said movable member includes a magnet having a plurality of N poles and S poles alternately disposed in the shifting direction thereof.

3. A linear motor apparatus according to claim 1, wherein said driver controls the current applied on said coils.

4. A linear motor apparatus according to claim 3, wherein the magnetic flux distribution, B(y), of said movable member is approximated by a wave distribution represented by the following equation (1), and wherein said driver controls the currents in accordance with the following equation (2):

$$B(y) = a_1 \sin\omega y + a_2 \sin 3\omega y \qquad (1)$$

$$i_k = i_r \left( a_1 \cos\left\{ \frac{(3k-2)}{2}\pi - \omega x \right\} + a_2 \cos\left\{ \frac{3(3k-2)}{2}\pi - 3\omega x \right\} \right)$$

$$\text{where } a_1 = \frac{4A}{\pi\omega\tau}\sin\omega\tau, \; a_2 = \frac{4A \sin 3\omega\tau}{\pi\omega\tau 3^2} \qquad (2)$$

wherein y is the position of said stator, $i_k$ is the current through the k-th coil of said stator, k is the number of the coil of said stator, $i_r$ is a predetermined current target value, A is the amplitude of the wave, τ is the inclination of the wave, and ω is the angular frequency of the wave determined by the duty cycle of the wave.

5. A linear motor apparatus according to claim 1, wherein said driver drives first and second coils at a first time and does not drive a third coil at the first time so that the current applied to the third coil is zero at the first time, and at a second time later than the first time, said driver drives the third coil to supply current thereto, in response to the shifting of said movable member.

6. A linear motor apparatus according to claim 1, wherein said detector detects position information or speed information of said movable member with respect to said stator.

7. A linear motor apparatus according to claim 1, wherein the approximation is a Fourier series approximation.

8. An exposure system comprising:

(A) a stage;

(B) means for exposing a substrate on said stage to light to form a pattern; and (C) a linear motor for moving said stage, said motor comprising:

(i) a movable member, shiftable along a shifting direction to move said stage, said movable member including a permanent magnet forming a predetermined magnetic flux distribution;

(ii) a stator having a plurality of coils arranged along the shifting direction of said mover, the plurality of coils being arranged over a range of shifting of said movable member and being separately excitable;

(iii) a detector for detecting a relative position of said movable member with respect to said stator;

(iv) a target current value generator for calculating for each of two or more coils an independent current value which generates an individually determined propulsive force from each of the two or more coils, such that the sum of the individually determined propulsive forces is substantially equivalent to a predetermined propulsion target value; and (v) a driver for supplying a current equal to the independent current value to each of the two or more coils simultaneously, wherein (a) an output of said detector determines which coils said driver excites at a given time, and (b) the predetermined propulsion target value and an approximation of the predetermined magnetic flux distribution are used to determine the independent current values.

9. An exposure system according to claim 8, wherein said stage apparatus includes a first scanning stage for holding a reticle having a pattern through which the radiation passes and a second scanning stage for holding a base plate comprising said substrate.

10. A stage apparatus comprising:

(A) a stage; and (B) a linear motor for moving said stage, said motor comprising:

(i) a movable member, shiftable along a shifting direction to move said stage, said movable member including a permanent magnet having a predetermined magnetic flux distribution;

(ii) a stator having a plurality of coils arranged along the shifting direction of said movable member, the plurality of coils being arranged over a range of shifting of said movable member and being separately excitable;

(iii) a detector for detecting a relative position of said movable member with respect to said stator;

(iv) a target current value generator for calculating for each of two or more coils an independent current value which generates an individually determined propulsive force from each of the two or more coils, such that the sum of the individually determined propulsive forces is substantially equivalent to a predetermined propulsion target value; and (v) a driver for supplying a current equal to the independent current value to each of the two or more coils simultaneously, wherein (a) an output of said detector determines which coils said driver excites at a given time, and (b) the predetermined propulsion target value and an approximation of the predetermined magnetic flux distribution are used to determine the independent current values.

11. A linear motor apparatus, comprising:

a mover shiftable along a shifting direction, said mover including a permanent magnet forming a predetermined magnetic flux distribution;

a stator having a plurality of coils aligned along the shifting direction of said mover, said plurality of coils being arranged over the entire range of shifting of said mover and being separately excitable;

a detector for detecting the relative position of said mover with respect to said stator; and a driver for exciting two or more coils of said plurality of coils simultaneously, wherein an output of said detector determines which coils said driver excites at a given time and a predetermined propulsion target value is used to determine the current supplied from said driver to said two or more coils, wherein said driver controls currents applied to said two or more coils, and wherein the magnetic flux distribution, B(y), of said mover is approximated by a trapezoidal wave distribution represented by the following equation (1), and wherein said driver controls the currents in accordance with the following equation (2):

$$B(y) = a_1 \sin\omega y + a_2 \sin 3\omega y \qquad (1)$$

$$i_k = i_r \left[ a_1 \cos\left\{ \frac{(3k-2)}{2}\pi - \omega x \right\} + a_2 \cos\left\{ \frac{3(3k-2)}{2}\pi - 3\omega x \right\} \right]$$

$$\text{where } a_1 = \frac{4A}{\pi\omega\tau}\sin\omega\tau, \; a_2 = \frac{4A \sin 3\omega\tau}{\pi\tau 3^2} \qquad (2)$$

wherein y is the position of said stator, $i_k$ is the current through the k-th coil of said stator, k is the number of the coil of said stator, $i_r$ is a predetermined current target value, A is the amplitude of the wave, τ is the inclination of the wave, and ω is the angular frequency of the wave determined by the duty cycle of the wave.

12. A linear motor apparatus, comprising:
a movable member shiftable along a shifting direction, said movable member including a permanent magnet having a predetermined magnetic flux distribution;
a stator having a plurality of coils arranged along the shifting direction of said movable member, the plurality of coils being arranged over a range of shifting of said movable member and being separately excitable;
a detector for detecting a relative position of said movable member with respect to said stator;
a target power value generator for calculating for each of two or more coils an independent power value which generates an individually determined propulsive force from each of the two or more coils, such that the sum of the individually determined propulsive forces is substantially equivalent to a predetermined propulsion target value; and
a driver for supplying a power equal to the independent power value to each of the two or more coils simultaneously, wherein (i) an output of said detector determines which coils said driver excites at a given time, and (ii) the predetermined propulsion target value and an approximation of the predetermined magnetic flux distribution are used to determine the independent power values.

13. A linear motor apparatus for controlling the relative positions of a pair of members, one of which is movable relative to the other along a shift direction, said apparatus comprising:
magnetic means forming at least a portion of a first of said members, the magnetic means having a predetermined magnetic flux distribution;
a plurality of coils forming at least a portion of a second of said members, the plurality of coils arranged along the shifting direction, the plurality of coils being separately excitable;
a detector for detecting a relative position of the first member with respect to the second member;
a target power value generator for calculating for each of the plurality of coils an independent power value which generates an individually determined propulsive force from each of the plurality of coils, such that the sum of the individually determined propulsive forces is substantially equivalent to a predetermined propulsion target value; and
a driver for supplying a power equal to the independent power value to each of the plurality of coils simultaneously, wherein (i) an output of said detector determines which coils said driver excites at a given time, and (ii) the predetermined propulsion target value and an approximation of the predetermined magnetic flux distribution are used to determine the independent power values.

14. A stage apparatus comprising:
(A) a stage; and
(B) a linear motor for moving said stage, said motor comprising:
(i) a movable member shiftable along a shifting direction, said movable member including a permanent magnet having a predetermined magnetic flux distribution;
(ii) a stator having a plurality of coils arranged along the shifting direction of said movable member, the plurality of coils being arranged over a range of shifting of said movable member and being separately excitable;
(iii) a detector for detecting a relative position of said movable member with respect to said stator;
(iv) a target power value generator for calculating for each of two or more coils an independent power value which generates an individually determined propulsive force from each of the two or more coils, such that the sum of the individually determined propulsive forces is substantially equivalent to a predetermined propulsion target value; and
(v) a driver for supplying a power equal to the independent power value to each of the two or more coils simultaneously, wherein (a) an output of said detector determines which coils said driver excites at a given time, and (b) the predetermined propulsion target value and an approximation of the predetermined magnetic flux distribution are used to determine the independent power values.

15. A stage apparatus comprising:
(A) a stage; and
(B) a linear motor for controlling the relative positions of a pair of members, one of which is movable relative to the other along a shifting direction, said motor comprising:
(i) magnetic means forming at least a portion of a first of said members, the magnetic means having a predetermined magnetic flux distribution;
(ii) a plurality of coils forming at least a portion of a second of said members, the plurality of coils arranged along the shifting direction, the plurality of coils being separately excitable;
(iii) a detector for detecting a relative position of the first member with respect to the second member;
(iv) a target power value generator for calculating for each of the plurality of coils an independent power value which generates an individually determined propulsive force from each of the plurality of coils, such that the sum of the individually determined propulsive forces is substantially equivalent to a predetermined propulsion target value; and
(v) a driver for supplying a power equal to the independent power value to each of the plurality of coils simultaneously, wherein (a) an output of said detector determines which coils said driver excites at a given time, and (b) the predetermined propulsion target value and an approximation of the predetermined magnetic flux distribution are used to determine the independent power values.

16. An exposure system comprising:
(A) a stage;
(B) means for exposing a substrate on said stage to light to form a pattern; and
(C) a linear motor for moving said stage, said motor comprising:
(i) a movable member shiftable along a shifting direction, said movable member including a permanent magnet having a predetermined magnetic flux distribution;
(ii) a stator having a plurality of coils arranged along the shifting direction of said movable member, the plurality of coils being arranged over a range of shifting of said movable member and being separately excitable;
(iii) a detector for detecting a relative position of said movable member with respect to said stator;
(iv) a target power value generator for calculating for each of two or more coils an independent power value which generates an individually determined propulsive force from each of the two or more coils, such that the sum of the individually determined propulsive forces is substantially equivalent to a predetermined propulsion target value; and (v) a driver for supplying power equal to the independent power value to each of the two or more coils simultaneously, wherein (a) an output of said detector determines which coils said driver excites at a given time, and (b) the predetermined propulsion target value and an approximation of the predetermined magnetic flux distribution are used to determine the independent power values.

17. An exposure system comprising:

(A) a stage;

(B) means for exposing a substrate on said stage to light to form a pattern; and (C) a linear motor for controlling the relative positions of a pair of members, one of which is movable relative to the other along a shifting direction, said motor comprising:

(i) magnetic means forming at least a portion of a first of said members, the magnetic means having a predetermined magnetic flux distribution;

(ii) a plurality of coils forming at least a portion of a second of said members, the plurality of coils arranged along the shifting direction, the plurality of coils being separately excitable;

(iii) a detector for detecting a relative position of the first member with respect to the second member;

(iv) a target power value generator for calculating for each of the plurality of coils an independent power value which generates an individually determined propulsive force from each of the plurality of coils, such that the sum of the individually determined propulsive forces is substantially equivalent to a predetermined propulsion target value; and (v) a driver for supplying power equal to the independent power value to each of the plurality of coils simultaneously, wherein (a) an output of said detector determines which coils said driver excites at a given time, and (b) the predetermined propulsion target value and an approximation of the predetermined magnetic flux distribution are used to determine the independent power values.

* * * * *

UNITED STATES PATENT AND TRADEMARK OFFICE
CERTIFICATE OF CORRECTION

PATENT NO. : 5,973,459
DATED : October 26, 1999
INVENTOR(S) : HIROSHI ITOH

Page 1 of 2

It is certified that error appears in the above-identified patent and that said Letters Patent is hereby corrected as shown below:

ON THE COVER PAGE AT ITEM [56] "References Cited":
Under "U.S. PATENT DOCUMENTS:" "Sakamotor" should read --Sakamoto--.

COLUMN 1:
Line 59, "of" should be deleted.

COLUMN 4:
Line 7, "further" should read --a further--.

UNITED STATES PATENT AND TRADEMARK OFFICE
CERTIFICATE OF CORRECTION

PATENT NO. : 5,973,459
DATED : October 26, 1999
INVENTOR(S) : HIROSHI ITOH

It is certified that error appears in the above-identified patent and that said Letters Patent is hereby corrected as shown below:

<u>COLUMN 6</u>:
Line 12, "coil" should read --coils--;
Line 19, "Assuming" should read --Assume--; and Line 30, "$a_2 4A\sin 3\dfrac{\omega\tau}{\pi\omega\tau 3^2}$" should read --$a_2 = 4A\sin 3\dfrac{\omega\tau}{\pi\omega\tau 3^2}$--.

Signed and Sealed this

Twenty-first Day of November, 2000

Attest:

Q. TODD DICKINSON

*Attesting Officer*  *Director of Patents and Trademarks*